United States Patent [19]
Carlnäs et al.

[11] 3,976,089
[45] Aug. 24, 1976

[54] SENSING DEVICE

[76] Inventors: Bengt Erik Carlnäs, Bivagen, 184 00 Akersberga; Bror Christer Ingemar Sundvall, Holmvagen 2, 194 99 Upplands Vasby, both of Sweden

[22] Filed: Oct. 3, 1974

[21] Appl. No.: 511,518

[30] Foreign Application Priority Data
Oct. 12, 1973  Sweden .............................. 7313871

[52] U.S. Cl. .................................. 137/83; 73/37.6
[51] Int. Cl.² ......................................... G01B 13/00
[58] Field of Search .................. 137/83; 73/37, 37.5, 73/37.6, 37.7, 37.8, 37.9

[56] References Cited
UNITED STATES PATENTS

| | | | |
|---|---|---|---|
| 2,969,670 | 1/1961 | Liebreich............................ | 73/37.5 |
| 3,188,856 | 6/1965 | Schneider.......................... | 137/83 X |
| 3,340,886 | 9/1967 | Jacobsen............................. | 137/83 |
| 3,465,570 | 9/1969 | MacLean et al..................... | 73/37.5 |
| 3,482,433 | 12/1969 | Gladwyn............................. | 73/37.5 |
| 3,490,674 | 1/1970 | Ott, Jr. et al. ................... | 73/37.7 X |
| 3,523,447 | 8/1970 | Sharp et al......................... | 73/37.5 |

*Primary Examiner*—William R. Cline
*Attorney, Agent, or Firm*—George H. Mortimer

[57] ABSTRACT

There is provided a device for sensing small movements of an object from its desired orientation or position. The device uses for its operation a working fluid, such as air, and comprises means for creating a substantially closed curtain of working fluid adjacent the object being sensed. Means are also provided for sensing the pressure prevailing within said curtain of working fluid. The means for creating said curtain is so constructed that movements of said object from said desired orientation of the order of magnitude of 0.23 cms and less can be reliably detected.

8 Claims, 6 Drawing Figures

SENSING DEVICE

FIELD OF THE PRESENT INVENTION

The present invention relates to sensing devices, and more particularly to sensing devices of the type with which there is used a fluid, such as air, and which comprise a slot surrounding an elongated island which is arranged to face the material or object to be sensed and through which is passed a working medium in a manner such as to form an at least substantially closed curtain of working medium, adjacent to the object to be sensed, and a passage which is arranged to discharge through said island within said curtain, the pressure prevailing within said curtain being sensed in said passage.

BRIEF DESCRIPTION OF THE PRIOR ART

Sensing devices of this type are known to the art and may be used to sense the departure of a workpiece from its desired position or orientation. A common feature of these devices is that the slot is of circular configuration, whereby the medium curtain formed via the slot obtains a conical form. As a result of their construction, these known devices have certain limitations, one such limitation being that, because the pressure in the conical curtain must be maintained, they are unable to sense slight displacements of said objects or material relative said device, said pressure increasing the nearer the device approaches said object or material.

OBJECT OF THE PRESENT INVENTION

It is desired in the art to sense for control purposes the presence of grooves and ridges in an article or the change in position of an edge surface of a workpiece for example, by means of sensing devices which operate in conjunction with a working medium such as a fluid. Practical tests have shown, however, that the aforedescribed sensing devices which work with a conical curtain of working medium do not detect satisfactorily small changes in the position of an edge surface of a workpiece, thereby making reliable control less possible.

An object of the present invention is to provide a sensing device of the aforementioned type with which the slot to from the curtain is so designed that the pressure prevailing in the curtain of fluid produced thereby is subjected to large pressure differences upon but small movements relative thereto of an edge surface of the object being sensed.

For this purpose this invention consists in a sensing device comprising a slot which is arranged to face an object to be sensed and through which a working fluid is passed to form a substantially closed curtain of working medium, and a passage via which the pressure prevailing within said curtain is sensed, wherein the configuration of said slot is such as to create a relatively large pressure difference in said object or passage upon a relatively small movement of said material.

BRIEF DESCRIPTION OF THE ATTACHED DRAWINGS

So that the present invention will be more readily understood and further features thereof made apparent, a sensing device constructed in accordance with the present invention will now be described by way of example only with reference to the accompanying drawing, in which FIG. 1 is an exploded view of a sensing device constructed in accordance with the invention, FIG. 2 is a front view partly in perspective, of a sensing device according to FIG. 1, showing the configuration of the slot and the passage which is intended to exit within the curtain of medium produced via said slot, FIG. 3 is a sectional view of a sensing device constructed in accordance with the invention and used in conjunction with the sensing of the edge of a metal plate, FIG. 4 is a diagram of the pressure prevailing in said passage as a function of the distance $d_d$ in FIG. 3, FIG. 5 is a diagram of the pressure in the passage discharging within the curtain as a function of the displacement $d_s$ of the metal plate in FIG. 3, FIG. 6 shows a device for controlling a sensing device as used in accordance with the invention.

DESCRIPTION OF THE PREFERRED EMBODIMENT

Figure 1:
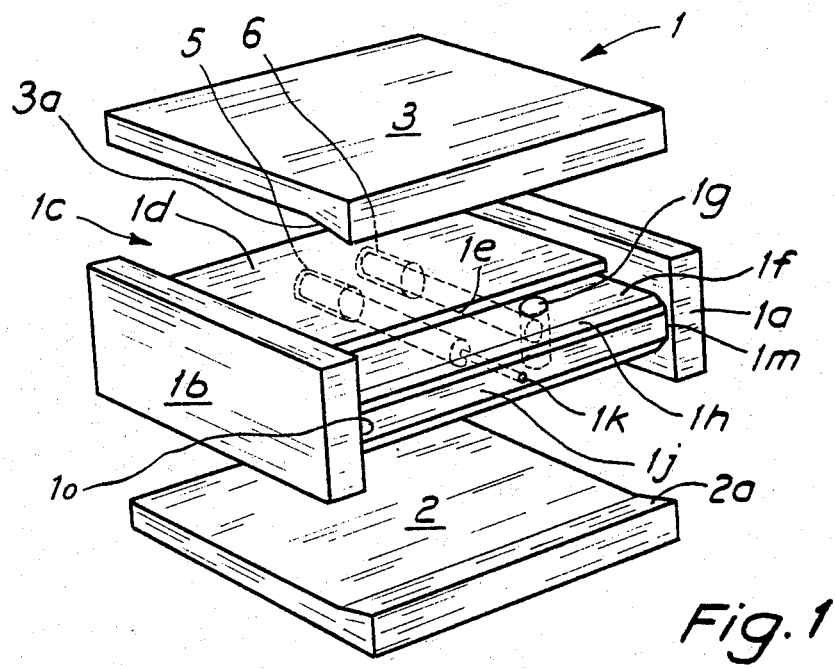

As beforementioned, FIG. 1 is an exploded view of a sensing device 1 constructed in accordance with the invention. The illustrated device comprises a main or center portion shown generally by the reference 1c and two planar portions 2 and 3 forming top and bottom walls of device 1. On two mutually opposing sides of the main or center portion 1 there are arranged side plates 1a, 1b, said plates forming side walls having the center portion 1c extending therebetween. As will be seen from the drawing, the centre portion 1c has an upper planar surface 1d and a corresponding lower planar surface which cannot be seen in the drawing, against which surfaces the respective planar portions 2 and 3 abut when the parts are assembled. Since that part of the center portion 1c which is not visible in the Figure is identical with the upper part which can be seen, the following description will only be made with respect to the upper part of said center portion. The center portion 1c has an edge surface 1e, via which there is formed a further downwardly offset planar surface 1f, as shown in the Figure. There is thus formed by the surface 1f, and a similar upwardly offset planer surface on the unseen lower planer surface, a portion of reduced thickness on one edge of the main or center portion 1c which will be referred to as the front edge. Arranged in the surfaces 1f is a hole 1g at the end of a fluid supply line 5 through which a working medium can be passed. The planar surface 1f has on the front edge thereof remote from the edge surface 1e a chamfered edge 1h which merges with a vertical front surface on the reduced thickness portion 1j, in which there is arranged a hole 1k. The hole 1k may be circular or rectangular in shape and constitutes the discharge orifice of the aforementioned passage discharging within the curtain of working medium. The portion of reduced thickness between offset planar surfaces 1f terminates short of the side plates 1a and 1b, so that it also has a reduced length compared to center section 1c, thereby leaving a gap 1m and 1o respectively, the gap 1m being located in the drawing between the planar surface 1f and the side plate 1a, and the gap 1o being located between the side plate 1b and said planar surface 1f, thus forming an elongated island 1j surrounded by a slot 4.

It should be mentioned here that the hole 1g extends completely through the reduced thickness portion 1j of the center portion 1c and has a discharge orifice in each offset plane surface 1f of said island 1j behind the chamfered edges 1h.

As will be seen from FIG. 1, the portions 2 and 3 are provided with inclined surfaces 2a and 3a respectively. When said portions 2 and 3 are placed on the center portion 1c, said inclined surfaces will form a gap between the chamfered surface 1h and a corresponding chamfered surface on the underside of the reduced thickness portion 1j at the front edge of the center portion 1c. The angle of inclination of the portions 1h and 3a shown in FIG. 1 are identical, so that a uniform slot is formed. It lies within the purview of the invention, however, to arrange that the gap narrows forwardly as seen in the FIG. 3, in which case the portions 2a and 3a respectively should be angled more acutely than the corresponding chamfered portions 1h of the center portion 1c.

Figure 2:
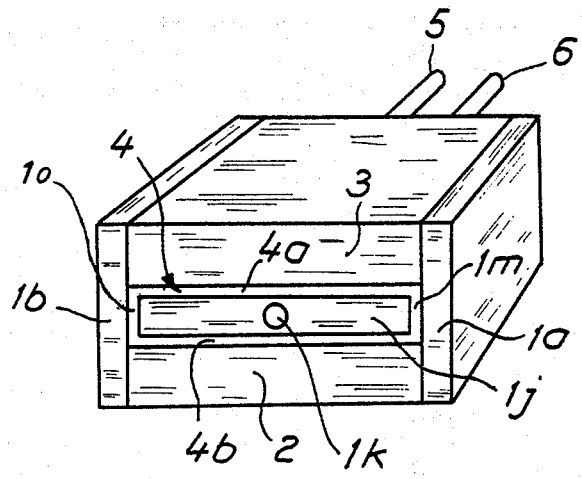

FIG. 2 is a perspective view of the sensing device shown in FIG. 1 in an assembled condition, and shows the side plates 1a and 1b of the main portion 1c together with the bottom and top portions 2 and 3. Also visible in FIG. 2 is the front surface of the elongated island 1j surrounding the orifice 1k of the passage 5 which is intended to discharge within the curtain of working medium flowing out of the surrounding elongated slot 4 which in this embodiment comprises long top and bottom slots 4a and 4b joined by short side slots 1m and 1o.

With the embodiment illustrated in FIG. 2, the slot 4 is of rectangular shape, with the horizontal length exceeding the width thereof as seen in the Figure. The ratio of length to width as shown in FIG. 2 is of the order of magnitude of 5:1, although said ratio may lie within the range of 10-2:1 preferably within the range of 3-6:1.

When the working medium forming the aforementioned curtain comprises air, it has been found that the slot should have a width within the range 0.1-0.25 mm. It is important that the gap is able to provide a substantially completely closed curtain of working medium around the elongated island 1j. This is ensured by the fact that, with the device according to the present invention, the working medium is supplied to both the upper and the lower portion of the slot 4 at the same time as it is supplied to the gaps 1m and 1o which are formed on their respective sides of the planar surface 1f at the ends of the island 1j.

In FIG. 2 the passage whose orifice 1k opens through island 1j out into the curtain of working medium is shown by the reference 5, while the fluid supply line through which fluid is passed as a continuous curtain from the sensing device is identified by the reference 6.

Although the slot 4 shown in the embodiment illustrated in FIG. 2 has a rectangular configuration around rectangular island 1f, said slot may also have the form of a semi-circle with a portion of said slot such as 4b forming a diameter of said semi-circle and the other portion comprising 4a, 1m, and 1o forming the semicircular portion. The slot may also have the form of an elipse, in which case the major axis of the elipse should be much greater than the minor axis, since the sensing device of the present invention is based on the concept that a large portion of the curtain of working medium formed via the slot shall be greatly affected by only a small movement of the object or material being sensed by said device. In all of these embodiments the island 1j is characterized by its elongated shape, by the presence of the orifice 1k in the front surface thereof, by the surrounding wall comprising 1a, 1b, 2 and 3 having a front surface in the plane of its front surface, said surfaces defining the slot including a substantially rectilinear surface so arranged as to make small movements of the object being sensed relative to said rectilinear surface to be detected. By small movement is meant here movement to the extent of 0.25 cm and less.

Figure 3:
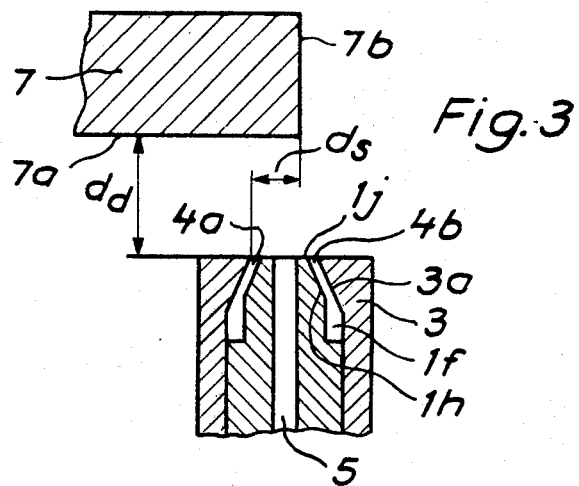
Figure 4:
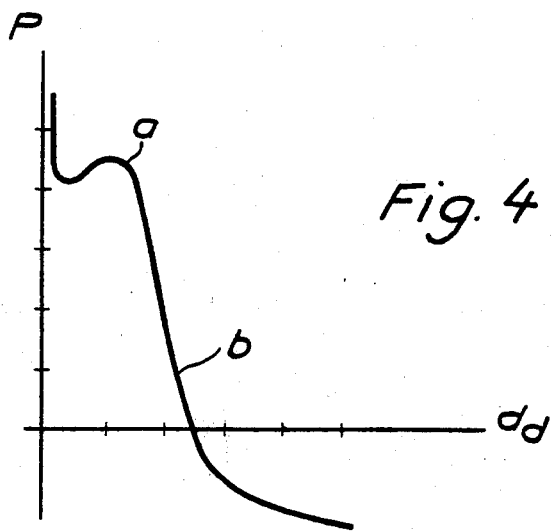

In FIG. 3 the sensing device according to the invention is shown in top plan view and in section, arranged adjacent an object to be sensed. In FIG. 3, the distance between the vertical surface 1j of the sensing device when in use and the surface 7a of the material or object facing the sensing device is shown by the reference $d_d$. In order to exemplify the function of the sensing device the object 7 in FIG. 3 is shown to have an edge 7b which is displaced through a distance shown as $d_s$ relative to the sensing device. The variation in the pressure prevailing in the passage 5 as a result of the variation in distance is more clearly illustrated in FIGS. 4 and 5. In FIG. 4 the pressure prevailing in the passage 5 is shown as a function of the distance $d_d$. As will be seen from FIG. 4, when the distance between the object and the sensing device is small the pressure $p$ is high, while this pressure falls as the distance increases. In order to obtain optimal sensing results the distance between the sensing device and the object should lie between the area of the curve $a$ to $b$.

Figure 5:
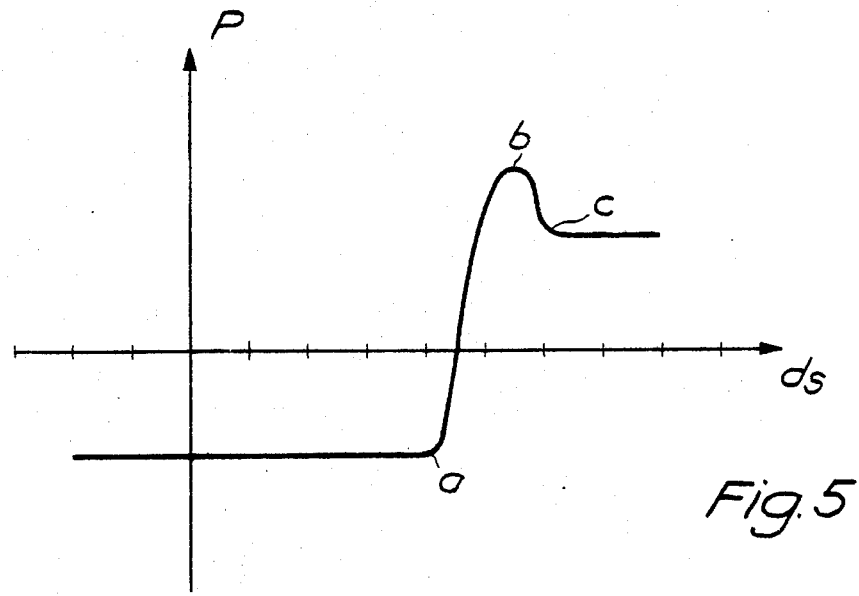

FIG. 5 shows the pressure variations in the passage 5 when the edge 7b of the object 7 is moved past the sensing device. When the edge 7b first enters the medium curtain formed by the portion 4a of the passage, no noticeable change in pressure can be seen in the passage 5. Neither does continued movement of the edge 7b cause any change in the pressure in the passage 5, and it is only when the edge 7b approaches the vicinity of the curtain of the passage 4b i.e. the point $a$ in FIG. 5, that a change of pressure takes place. As will be seen from the Figure, continued movement in this respect of the edge 7b causes a considerable increase in the pressure in the passage 5, up to the point $b$. If the edge 7b is displaced further, a slight drop in pressure takes place down to point $c$, FIG. 5, whereafter further displacement shows no change in pressure. When the sensing device according to the invention is used to control the position of the edge 7b, the position of said edge should be adjusted so that the pressure differences are sensed in respect of the section $a$ to $b$ of the curve shown in FIG. 5. It should be noted that, in this respect, it is necessary to lie within a restricted area and beneath the point $c$ of the curve, in order to obtain a simpler sensing circuit.

Figure 6:
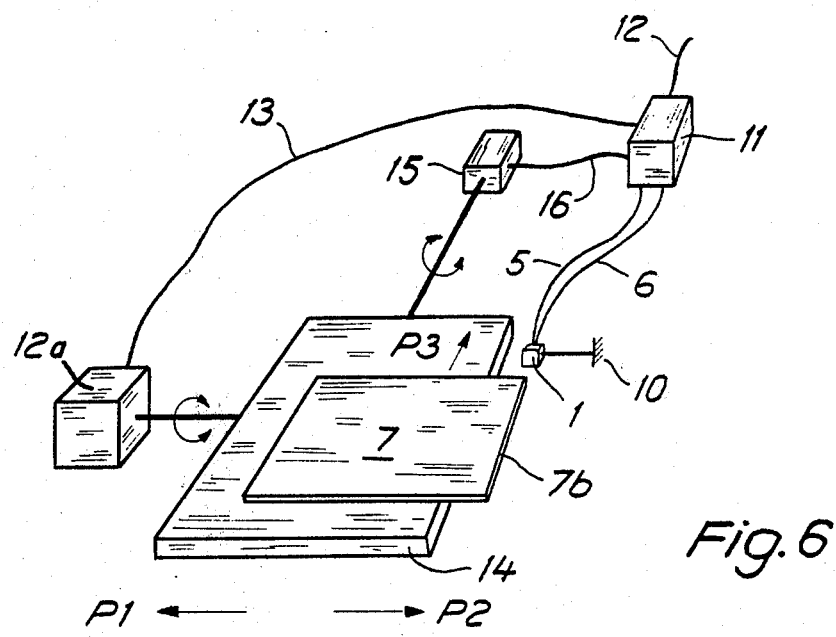

FIG. 6 illustrates diagrammatically a combination of means and a manner of use of the sensing device according to the invention. With the exemplified manner of use, the sensing device 1 is attached to a supporting surface 10. By means of a control device 11, working fluid is passed to the sensing device 1 through the line 6 and the pressure differences prevailing in the curtain of working medium produced via said slot are sensed via the line 5. The pressure variations prevailing in the line 5 are measured in the control device 11, which is fed a working medium, e.g., air, via a line 12, and the pressure variations are converted in said device 11 and are arranged to activate an electric motor or a fluid motor 12a via a line 13 in a manner such as either to rotate said motor clockwise or anticlockwise. The object 7 to be sensed is arranged on a table 14 to which the shaft of motor 12a has a screw connection, and a pressure increase in the line 5, generated by the control device 11, produces a signal which rotates the electric motor so that said table 14 is displaced in the direction of the arrow P1. With a decrease in the pressure in the line 5, the signals in the control device 11 are transformed so that the electric motor 12a will move the table 14 in the direction of the arrow P2. In this way it is ensured that the edge 7b of the object 7 is always located at a certain distance from the sensing device 1. The device illustrated in FIG. 6 may be used for automatic welding purposes to ensure that the object 7, which may be a metal plate, is correctly positioned. In this case an electric motor 15 can be arranged to move the table 14 in the direction of the arrow P3 via the control means 11 and a line 16. Naturally the table 14 is supported, by means not shown. The particular structures of the driving mechanism and other elements required to move the table in the direction of the arrows P1, P2 and P3 do not constitute part of the present invention and are not described because any suitable means for moving a work piece both longitudinally of and transversely to the sensing device 1 as described may be used in the combination of the invention.

As will be readily understood, if desired two sensing devices constructed in accordance with the invention may be used, said devices being arranged on their respective sides of an object to be sensed, which may have the form of a metal plate or a slotted strip, and the control means 11 to be activated so as to maintain said edge or said slotted strip between said sensing devices.

The sensing device according to the invention may also be used as a means for counting a number of slots in a slotted material.

We claim:
1. A sensing device comprising
   a. means including an elongated island with a first planar surface having a ratio of length to width within the range of 10:1 to 2:1 and a surrounding spaced wall forming a slot with said island adapted to face a surface of an object to be sensed which is many times larger than said slot and a fluid supply line for feeding working fluid through said slot to form a substantially closed curtain of working fluid, and
   b. a passage having a discharge orifice in the planar surface of said island via which the pressure prevailing within said curtain is sensed, said passage having an area in cross section that is small relative to the area of said planar surface of said island, the configuration of said slot being such as to create a relatively large pressure difference in said passage upon a relatively small movement of said object toward or away from said device.

2. A sensing device according to claim 1, wherein the surfaces of said device defining said slot include a substantially rectilinear surface so arranged as to enable movements of the object being sensed toward or away from said device of the order of magnitude of 0.25 cm or less to be detected.

3. A device according to claim 2, having means for mounting said device with said substantially rectilinear portion of said slot arranged to be placed in the vicinity of an edge of the object to be sensed, and means responsive to the pressure differences prevailing in said passage to guide said edge to a pre-determined position relative said device.

4. A device according to claim 1, wherein the slot is of rectangular configuration.

5. A device according to claim 4, wherein said ratio lies within the range of 3–6:1.

6. A device according to claim 1, wherein the means forming the slot comprises a center portion (1c) having a portion of reduced thickness between second planar surfaces (1f) and of reduced length at one edge thereof forming said elongated planar island (1j), walls (1a, 1b, 2, 3) engaging said center portion forming said slot (4) surrounding said elongated island, said liquid supply line passing through said center portion and having a discharge orifice in at least one of said second planar surfaces of said portion of reduced thickness, and said passage passing through said central portion to its discharge orifice in the said first planar surface of said island.

7. A device according to claim 6, wherein the walls forming said slot comprise side walls, two planar portions (2 and 3) forming top and bottom walls and having inclined surfaces facing said island, said island being rectangular and having chamfered edges opposite said inclined surfaces, and said liquid supply line having a discharge orifice in the second planar surfaces of said island behind each chamfered edge to provide said relatively large pressure difference in said passage.

8. A device according to claim 7, wherein said inclined surfaces have a greater angle of inclination than the opposed chamfered edges forming a gap which narrows forwardly.

* * * * *